US007630813B2

(12) United States Patent
Henry

(10) Patent No.: US 7,630,813 B2
(45) Date of Patent: Dec. 8, 2009

(54) METHOD FOR CONTROLLING ELECTROMECHANICAL BRAKES USING PARAMETER IDENTIFICATION AND NO ADDITIONAL SENSORS

(75) Inventor: Rassem Henry, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 325 days.

(21) Appl. No.: 11/447,708

(22) Filed: Jun. 6, 2006

(65) Prior Publication Data

US 2007/0282511 A1 Dec. 6, 2007

(51) Int. Cl.
*G06F 19/00* (2006.01)
*B60L 7/00* (2006.01)
*G05B 13/00* (2006.01)

(52) U.S. Cl. ............................ 701/70; 701/78; 188/158; 318/561

(58) Field of Classification Search .................... 701/1, 701/29, 31, 36, 70, 71, 74, 75, 76, 78, 82, 701/83; 188/1.11 L, 1.11 E, 156, 158, 159, 188/161–163; 303/3, 122.08, 122.11, 124, 303/150, 161, 162; 318/560, 561
See application file for complete search history.

(56) References Cited

U.S. PATENT DOCUMENTS

| 6,059,379 | A | * | 5/2000 | Deml et al. | 303/15 |
| 6,318,513 | B1 | * | 11/2001 | Dietrich et al. | 188/72.7 |
| 2005/0168066 | A1 | * | 8/2005 | Svendenius et al. | 303/150 |

* cited by examiner

*Primary Examiner*—Edward Pipala
(74) *Attorney, Agent, or Firm*—Thomas N. Twomey

(57) ABSTRACT

A method for controlling a force exerted by an actuator on a load, the actuator being driven by a motor, the method including the steps of modeling the force as a function of at least one parameter, the parameter having an initial value, determining a new value for the parameter, determining an observed force based at least in part upon the new value for the parameter and controlling a positioned of the actuator based at least in part upon the observed force.

14 Claims, 10 Drawing Sheets

METHOD FOR CONTROLLING ELECTROMECHANICAL BRAKES USING PARAMETER IDENTIFICATION AND NO ADDITIONAL SENSORS

BACKGROUND

The present application relates generally to control systems for controlling the application of torque and/or force by an actuator and, more particularly, to control systems with adaptive parameter identification for electromechanical brake systems and the like.

Electromechanical brake systems have been developed for use in the automotive, aerospace and aeronautical industries to control the speed, stability and operation of various vehicles and devices. Electromechanical brake systems, commonly referred to as brake-by-wire systems, have been used in combination with, or in place of, conventional hydraulic brake systems.

A typical electromechanical brake system includes an electric motor adapted to advance an actuator into engagement with brake pads and/or a rotor, thereby generating a braking force. The amount of braking force generated typically is a function of the distal advancement of the actuator. Therefore, the braking force may be controlled by controlling the operation of the electric motor.

The braking force applied by an electromechanical brake system typically is controlled by monitoring the actual force exerted by the actuator or the relative position of the actuator and controlling the electric motor based upon the force and/or position signals to achieve the desired braking result. The force may be monitored directly using force gauges or the like, thereby providing a direct indication of the braking force. Alternatively, the position of the actuator may be monitored using various sensors (e.g., encoders, resolvers or Hall-Effect) such that the displacement of the actuator may be converted into a force signal by, for example, modeling the brake system as a spring and multiplying the piston displacement by a spring constant.

Control systems using direct force signals have exhibited slower response times and reduced performance due to filtering required to reduce the high signal to noise ratio. Furthermore, control systems using actuator displacement to determine force have presented disadvantages associated with parameter variation associated with temperature fluctuations, friction effects, wear and the like.

Accordingly, there is a need for an improved control system for controlling the application of force by an electromechanical actuator.

SUMMARY

In one aspect, a method for controlling a force exerted by an actuator on a load includes the steps of modeling the force as a function of at least one parameter, the parameter having an initial value, determining a new value for the parameter, determining an observed force based at least in part upon the new value for the parameter and controlling a positioned of the actuator based at least in part upon the observed force.

In another aspect, a method for controlling a force exerted by an actuator on a load includes the steps of modeling the force as a function of at least one of a linear stiffness coefficient, a nonlinear stiffness coefficient, a motor damping coefficient and a motor torque constant, advancing the actuator in response to a force command, during the advancing step, monitoring a motor value of at least one of a motor position, a motor velocity and a motor current of said motor, determining a new value for at least one of the linear stiffness coefficient, the nonlinear stiffness coefficient, the motor damping coefficient and the motor torque constant based at least in part upon the motor value, determining an observed force of the actuator based at least in part upon the new value and controlling a positioned of the actuator based at least in part upon the observed force.

Other aspects of the disclosed control system and method will become apparent from the following description, the accompanying drawings and the appended claims.

BRIEF DESCRIPTION OF THE DRAWINGS

FIG. 7b is a graphical illustration of linear and nonlinear stiffness coefficients versus time of the ten consecutive tests of FIG. 7a;

FIG. 8b is a graphical illustration of motor torque constant and nonlinear stiffness coefficient results of the test of FIG. 8a.

DETAILED DESCRIPTION

Figure 1:
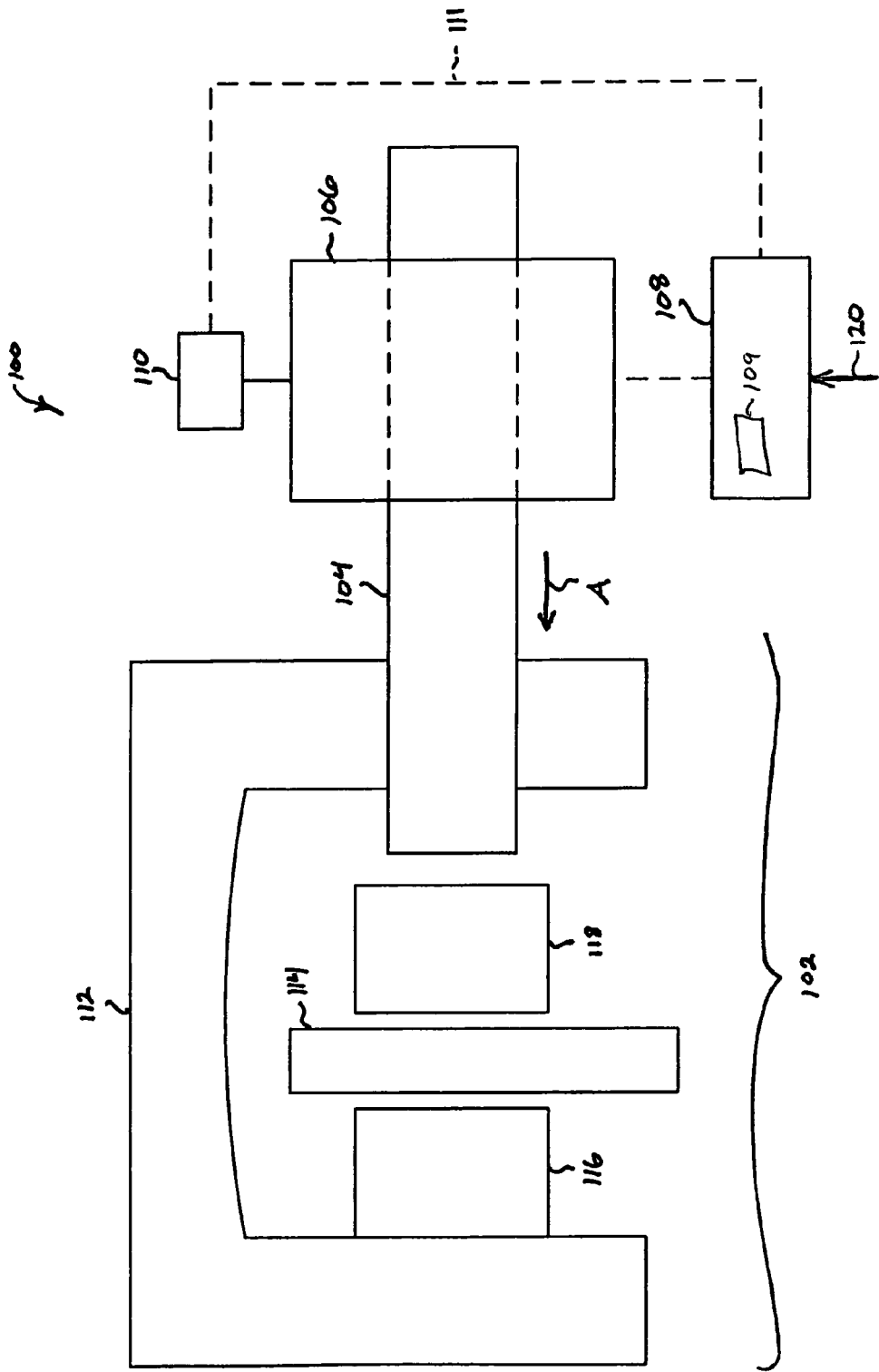
FIG. 1 is a schematic illustration of one aspect of the disclosed electromechanical brake system.

As shown in FIG. 1, one aspect of the disclosed electromechanical brake system, generally designated 100, may include a braking unit 102, an actuator 104, a motor 106, a control unit 108 and a sensor 110. The braking unit 102 may include a housing 112, a rotor 114 and two brake pads 116, 118. The motor 106 may be any motor or device capable of advancing the actuator 104 into engagement with the braking unit 102, such as a rotary motor, a linear motor or the like. The control unit 108 may be any unit or processor capable of receiving a command 120 and data signals from the sensor 110 and controlling the motor 106 based, at least in part, upon the command 120 and/or the data signals from the sensor 110. The sensor 110 may be a motor position sensor (e.g., an optical encoder or a resolver) and may be capable of transmitting a signal indicative of the position and/or displacement of the motor 106 to the control unit 108 by, for example, communication line 111. Another low cost example for the sensor 110 is a Hall-Effect sensor, which commonly is used with brushless DC motors to control the power transistors (MOSFETs or IGBTs). Alternatively, the sensor 110 may be a velocity sensor capable of measuring motor velocity or motor angular velocity, an acceleration sensor capable of measuring the acceleration of the motor 106 or any other sensor capable of detecting a state, property or value of the motor 106 and/or the actuator 104.

Thus, the motor 106 may operatively engage the actuator 104 to urge the actuator 104 in the direction shown by arrow A, thereby supplying a braking force to the braking unit 102 as the actuator 104 engages brake pad 118 of the braking unit 102.

Figure 2:
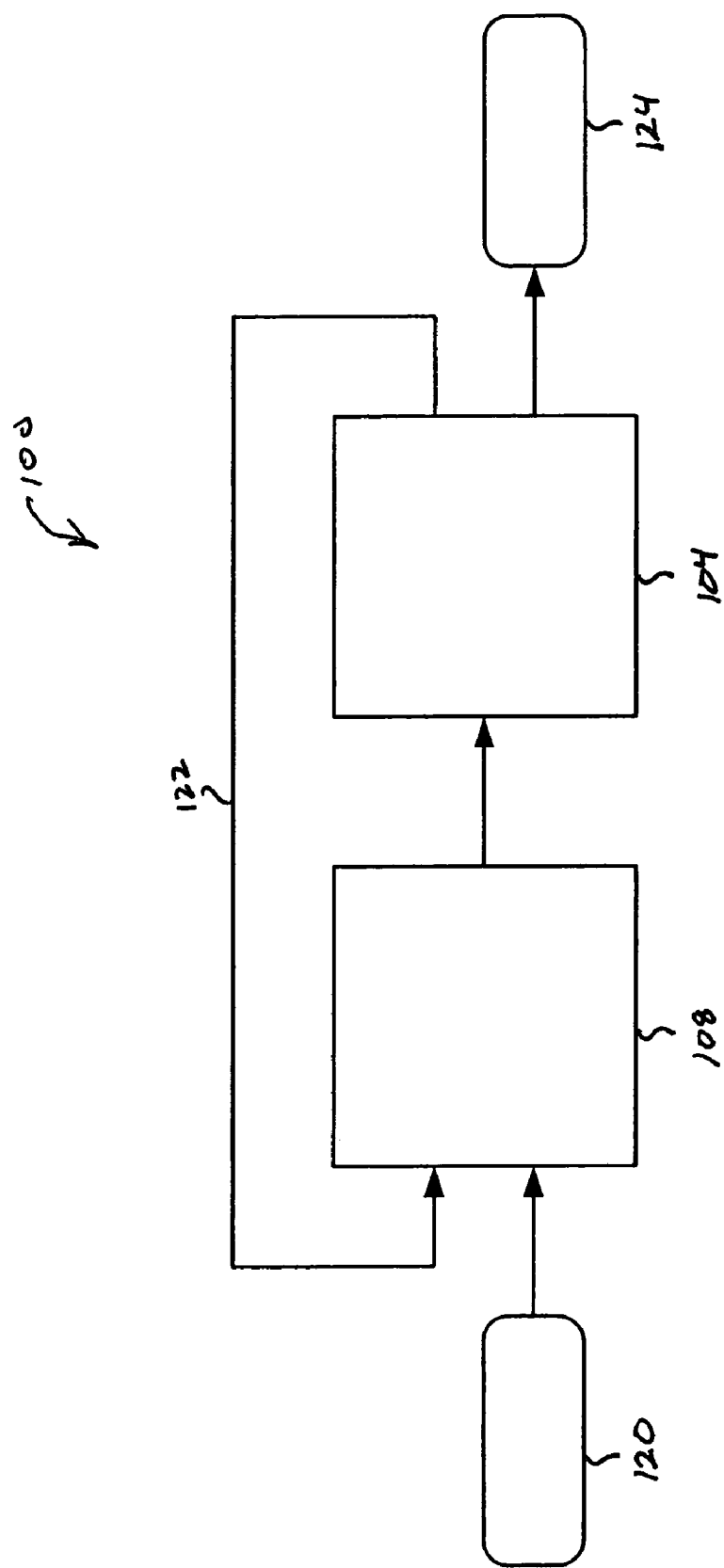
FIG. 2 is a block diagram of the system of FIG. 1.

Referring to FIG. 2, the control unit 108 may receive a brake force command signal 120 and a brake force feedback signal 122 and may control the actuator 104 such that the output brake force 124 of the actuator 104 corresponds to the brake force command signal 120. The brake force feedback signal 122 may include an observed (calculated or estimated) force value in lieu of, or in additional to, an actual force measurement. The observed force may be determined using any available technique, such as the modeling techniques described in greater detail below and/or the estimation techniques described in U.S. Ser. No. 60/701,540 filed Jul. 22, 2005 titled "Estimated Torque/Force Exerted by a Load Against a Motor-Driven Actuator," the entire contents of which are incorporated herein by reference.

In one aspect, the observed force of the feedback signal 122 may be determined according to the following equation:

$$F = k_1 x + k_{n1} x^2 + d_m \frac{\dot{\Theta}_m}{N} \quad \text{(Eq. 1)}$$

wherein F is the observed force, $k_1$ is the linear stiffness coefficient, x is the pad displacement starting from point-of-contact (i.e., zero position), $k_{n1}$ is the nonlinear stiffness coefficient, $d_m$ is the motor damping coefficient, $\Theta_m$ is the motor angle, N is the total gear ratio and a period (".") above a variable indicates a rate of change of that variable with respect to time. The rate of change of the motor angle with respect to time (i.e., the motor angular velocity) may be obtained by taking the derivative of the motor position signal from the sensor 110.

In one aspect, the linear stiffness coefficient $k_1$ may be related to the motor angle as follows:

$$\dot{k}_1 = -pJ_m N^2 (\dot{\hat{\Theta}}_m - \dot{\Theta}_m) \Theta_{m0} \quad \text{(Eq. 2)}$$

the nonlinear stiffness coefficient $k_{n1}$ may be related to the motor angle as follows:

$$\dot{k}_{n1} = -pJ_m N^3 (\dot{\hat{\Theta}}_m - \dot{\Theta}_m) \Theta_{m0}^2 \quad \text{(Eq. 3)}$$

and the motor damping coefficient $d_m$ may be related to the motor angle as follows:

$$\dot{d}_m = -pJ_m \dot{\Theta}_m (\dot{\hat{\Theta}}_m - \dot{\Theta}_m) \quad \text{(Eq. 4)}$$

$$\Theta_{m0} = xN \quad \text{(Eq. 5)}$$

and p is the adaptation gain (e.g., a positive number), $J_m$ is the motor inertia, $\Theta_m$ designated with "^" is the estimated motor angular velocity, $\Theta_{m0}$ is the motor angle starting from identified zero position and the period (".") above a variable indicates a rate of change of that variable with respect to time.

Thus, by applying a known force command and using initial values of the parameters $k_1$, $k_{n1}$ and $d_m$ as a starting point, the control unit 108 may determine new values for parameters $k_1$, $k_{n1}$ and $d_m$ using Eqs. 2-5 and the signal (e.g., a motor position/angle signal) from the sensor 110. Then, applying the new parameters to Eq. 1, the control unit 108 may determine the observed force of the system 100. In one aspect, new parameters $k_1$, $k_{n1}$ and $d_m$ may be determined during a test period wherein the known force command is applied with dither.

As described in greater detail below, the disclosed control system may determine new values for one or more of the parameters used to determine the observed force each time the system is initiated or, optionally, at any regular or random interval or upon the occurrence of an event, thereby providing the system with more accurate parameters for determining the observed force.

At this point, those skilled in the art will appreciate that various equations and parameters may be used to model the observed force. For example, in one alternative aspect, the observed force may be a function of, or otherwise dependent upon, the motor torque constant $K_t$, which may be related to the motor angle as follows:

$$\dot{K}_t = pJ_m (\dot{\hat{\Theta}}_m - \dot{\Theta}_m) I_a \quad \text{(Eq. 6)}$$

wherein $I_a$ is the motor current. Furthermore, similar equations may be used in combination with or in lieu of the equations set for above, wherein motor velocity error is replaced with motor position or motor current errors.

Figure 3:
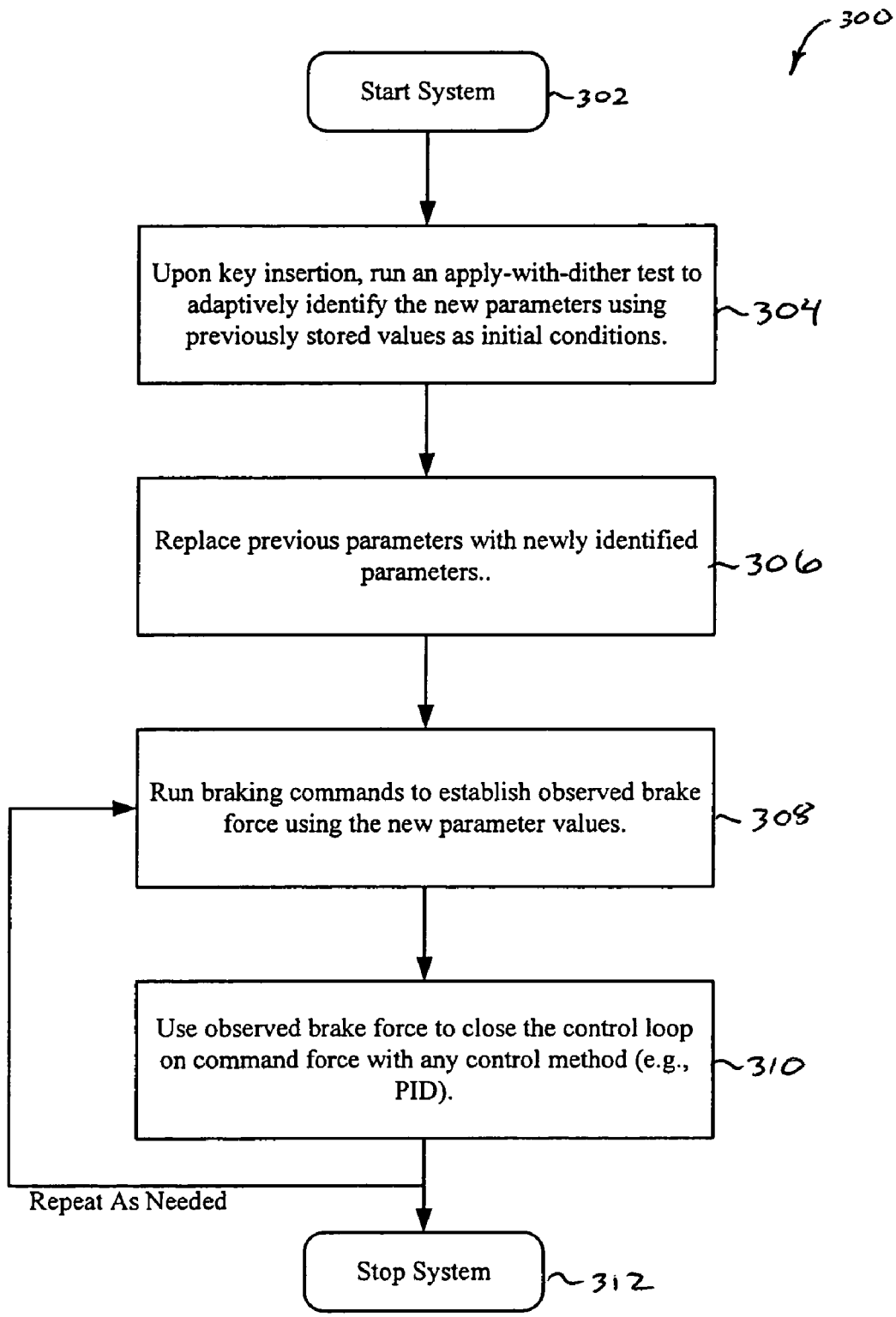
FIG. 3 is a flowchart of one aspect of an off-line control system for controlling the brake system of FIG. 2.

Referring to FIG. 3, one aspect of the disclosed control method is an off-line parameter estimation method, generally designated 300, and may be initiated at block 302 by, for example, inserting a key into the ignition of an automobile (not shown) equipped with an aspect of the disclosed control system.

As shown at block 304, the method 300 may use previously stored values for the parameters (e.g., parameters $k_1$, $k_{n1}$, $d_m$ and $K_t$) of the modeled equations as initial conditions to identify new, possibly more precise, values for the parameters using the techniques described herein. Once the new parameter values have been identified, the new values may be stored in system memory 109 (FIG. 1) and the old values may be removed from system memory 109, as shown by block 306. The memory 109 may be any available data storage medium, such as a nonvolatile memory, and, optionally, may be associated with the control unit 108.

Once the new parameter values have been established, per block 304, the method 300 may begin processing the brake force command 120. As shown in block 308, as the brake force command 120 is being processed, the control unit 108 may determine the observed brake force using the new parameter values stored in memory 109 and the signal received from the sensor 110. As shown in block 310, the determined observed brake force may be used as feedback data to close the control loop on the brake force command using any available control method known to those skilled in the art (e.g., proportional/integral/derivative control). One or more steps of the method 300 may be repeated to obtain the desired control and the method may end at block 312.

Figure 4:
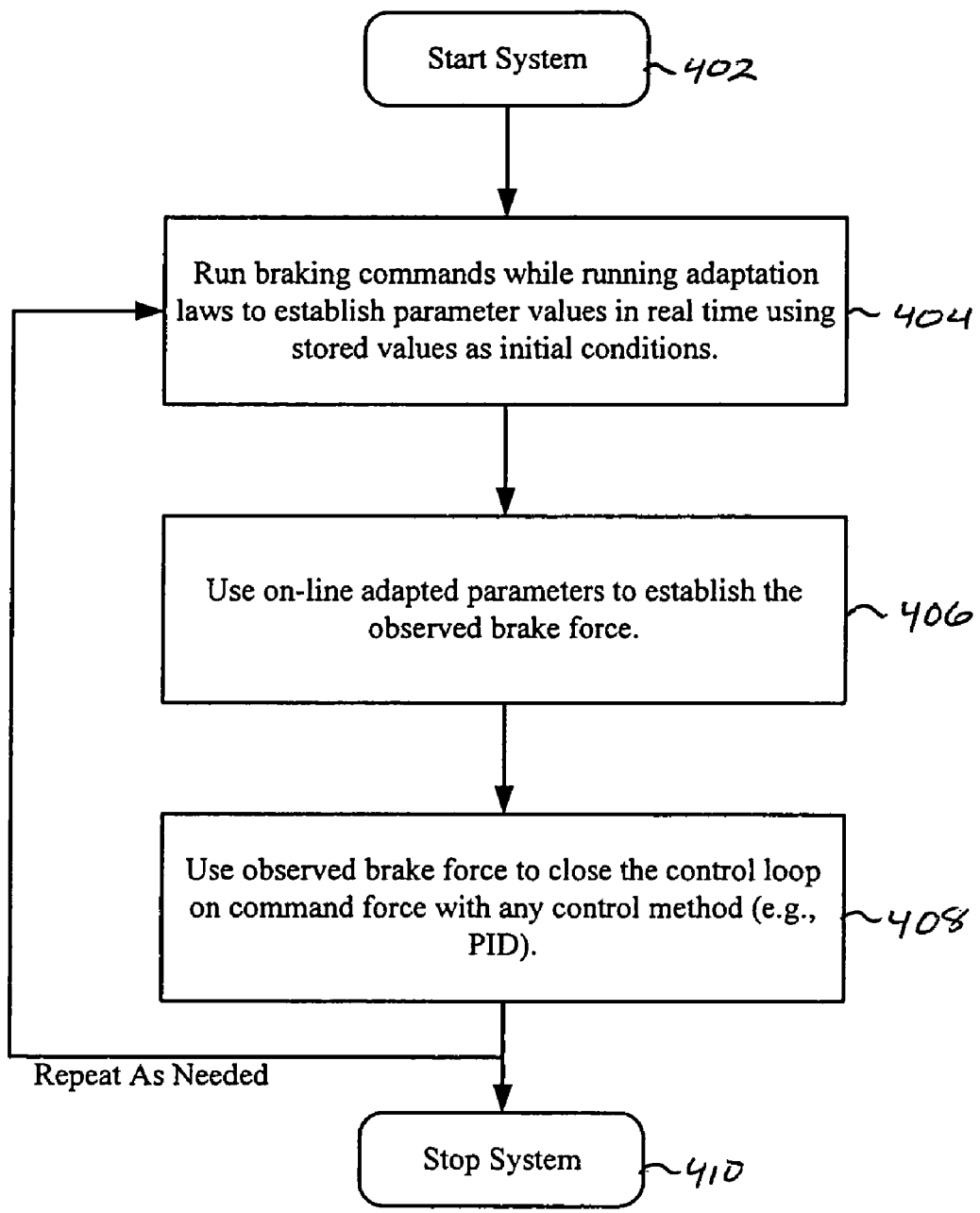
FIG. 4 is a flowchart of one aspect of an on-line control system for controlling the brake system of FIG. 2.

Referring to FIG. 4, another aspect of the disclosed control method is an on-line parameter estimation method, generally designated 400. The control method 400 may begin at block 402. For example, the control method 400 may be initiated at regular or random intervals during the operation of a vehicle or other device incorporating the disclosed control method or, optionally, the method operate continuously.

As shown at block 404, the method 400 may use previously stored values for the parameters (e.g., parameters $k_1$, $k_{n1}$, $d_m$ and $K_t$) of the modeled equations as initial conditions to identify new, possibly more precise, values for the parameters. The new parameter values may be obtained while run braking commands and processing the adaptation laws (e.g., Eqs. 2-4). Optionally, the new parameter values may be stored in system memory 109.

As shown at block 406, once the new parameter values have been established, the method 400 may determine the observed brake force. For example, the observed brake force may be determined using the new parameters and Eq. 1. As shown in block 408, the determined observed brake force may be used as feedback data to close the control loop on the brake force command using any available control method known to those skilled in the art (e.g., proportional/integral/derivative control). The process may be repeated to obtain the desired control and the process may end at block 410.

Figure 5:
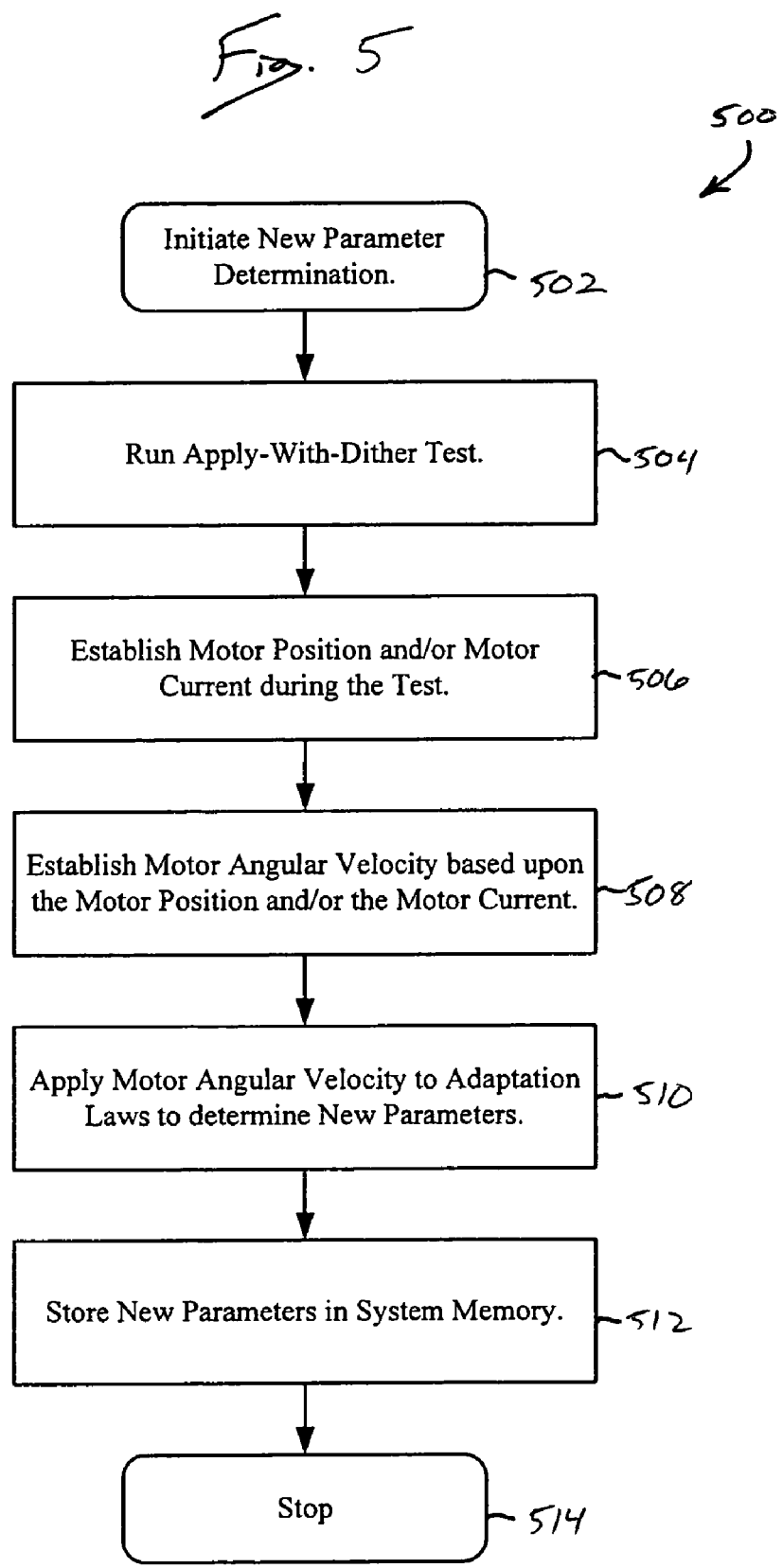
FIG. 5 is a flowchart of one aspect of a system for identifying new parameters pursuant to the control system of FIGS. 3 and/or 4.

As discussed above, the disclosed control system may identifying new values of the parameters (e.g., parameters $k_1$, $k_{n1}$, $d_m$ and $K_t$) used to determine the observed force, thereby providing a more accurate observed force. As shown in FIG. 5, one aspect of the new parameter identification process, generally designated 500, may begin at block 502 and, at block 504, the control unit 108 may run an apply-with-dither test. The apply-with-dither test may be a short (e.g., 1-3 seconds) test brake apply and may be run prior to normal operation of the system (i.e., off-line). For example, the apply-with-dither test may be run when a user inserts a key into the ignition of an automobile and prior to driving the automobile.

The apply-with-dither test may be initiated by communicating a test brake force command (e.g., 15,000-20,000 N) having a high frequency (i.e., dither), usually in the neighborhood of the system bandwidth, superimposed over the command. During the apply-with-dither test, the control unit 108 may monitor the sensor 110 (e.g., the control unit may monitor motor position and/or motor current), as shown in block 506, and may establish the motor angular velocity (or other measured or determined value), as shown in block 508, based upon the signal from the sensor 110 (e.g., by differentiating the motor position signal). Then, as shown in block 510, the control unit 108 may apply the motor angular velocity to the adaptation laws (e.g., one or more of Eqs. 2-6) to determine new values for the parameters (e.g., parameters $k_1$, $k_{n1}$, $d_m$ and $K_t$). As shown at block 512, the new values may be stored in system memory 109 and the process 500 may end at block 514.

In another aspect, the new parameter values may identified during normal operation of the system (i.e., on-line). For example, each time a user utilizes vehicle brakes, the system may use the user's brake command, with or without dither, to determine new parameter values based upon the adaptation laws and the signal(s) from the sensor 110.

Figure 6:
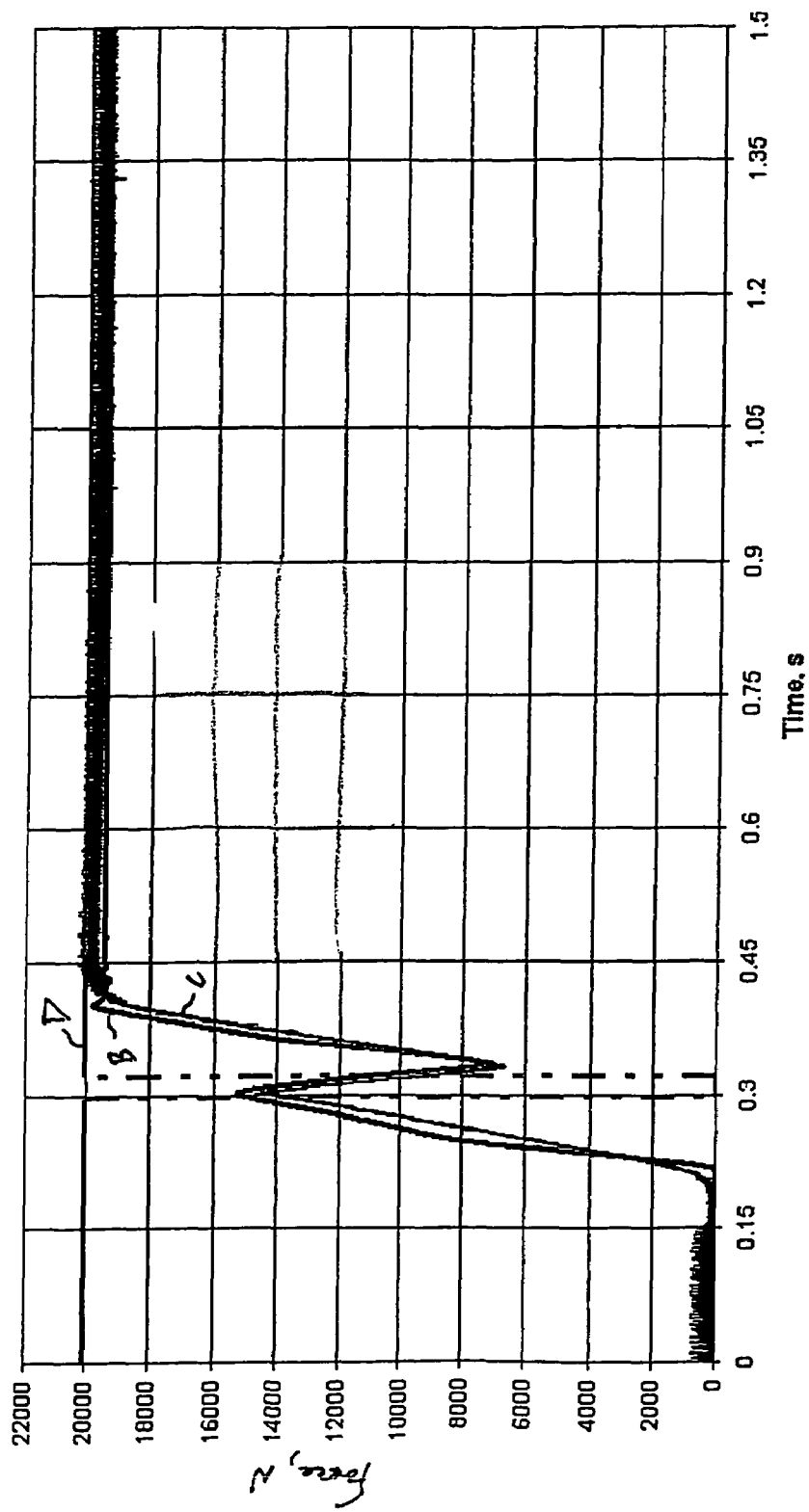
FIG. 6 is a graphical comparison of the measured force and the force observed according to the control system of FIG. 3.

As shown in FIG. 6, data line B depicts the observed force of an actuator, determined using the techniques described herein, in response to a command signal D. Data line C depicts that measured force of the actuator measured using a force sensor. Therefore, those skilled in the art will appreciate that the observed force provides an accurate indication of the force response of the actuator and may be used as a feedback signal to close the control loop on the command signal.

Figure 7A:
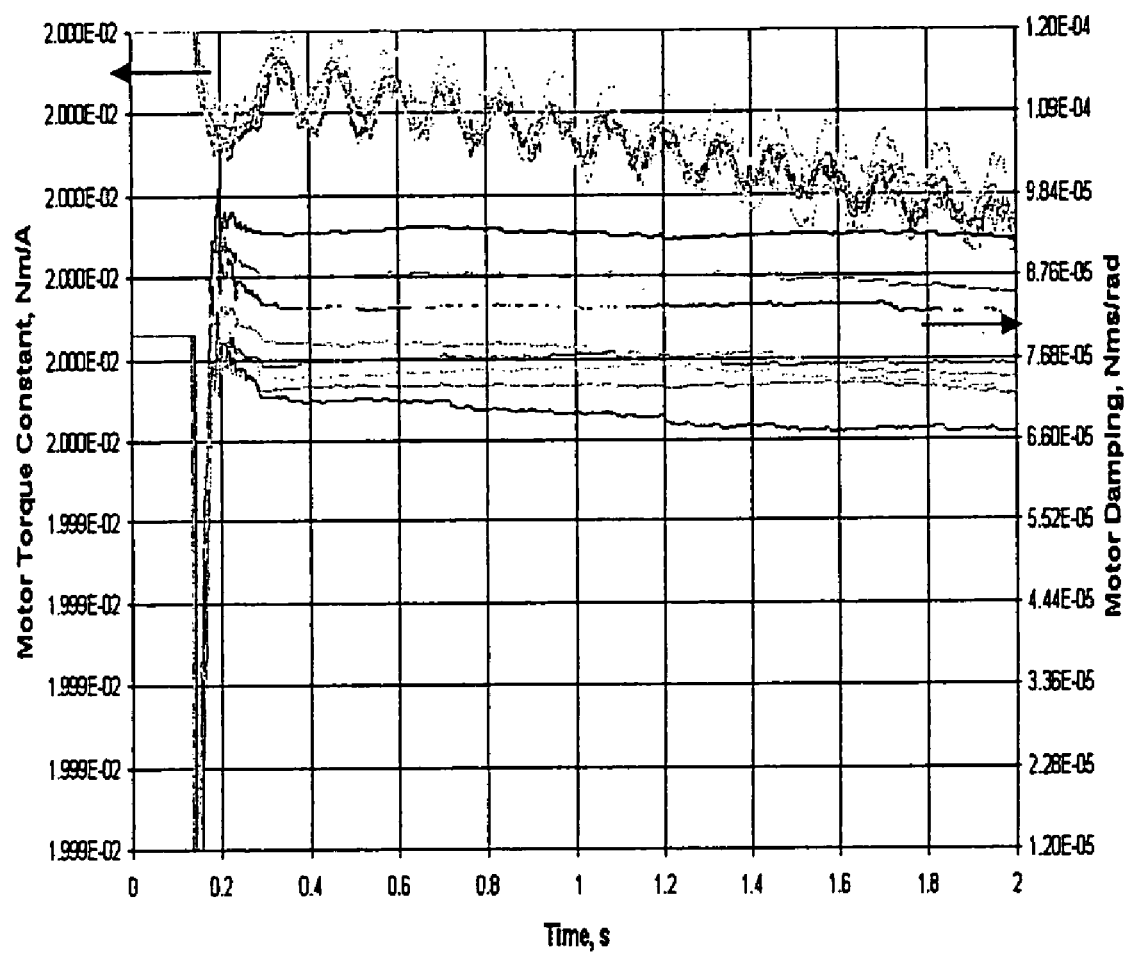
FIG. 7a is a graphical illustration of motor torque constant and motor damping versus time of ten consecutive tests for the estimated parameters using an encoder for motor position measurement.
Figure 7B:
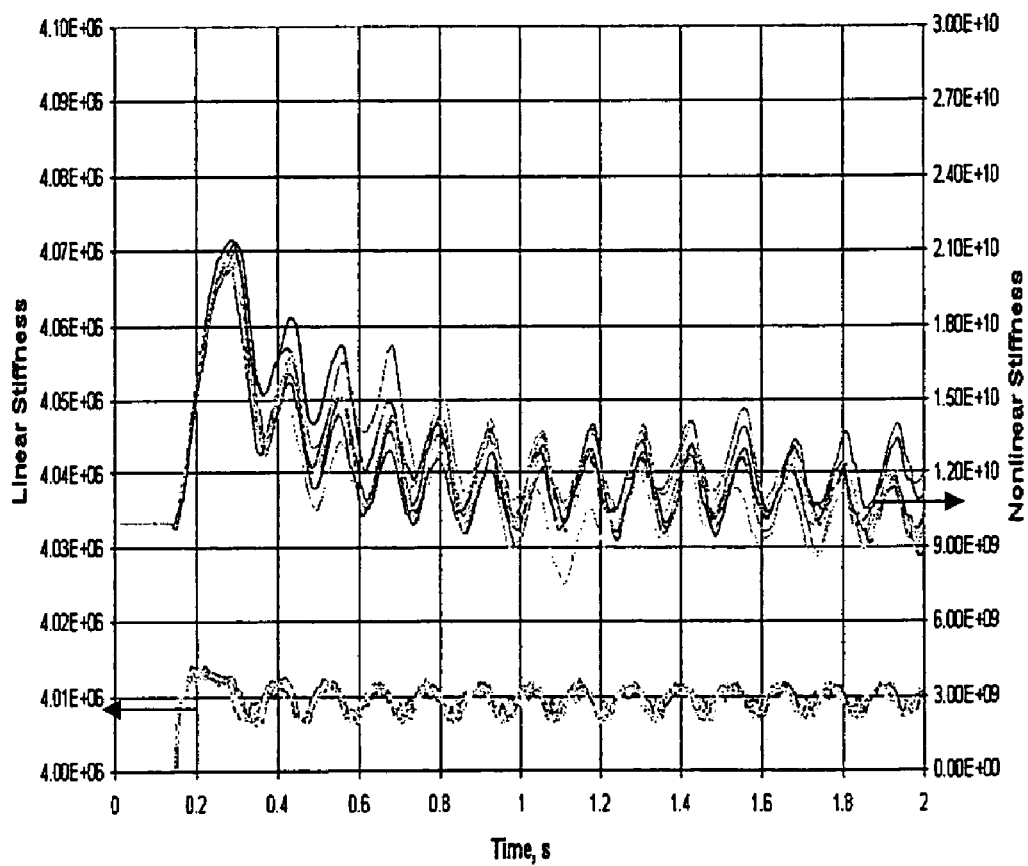
Figure 8A:
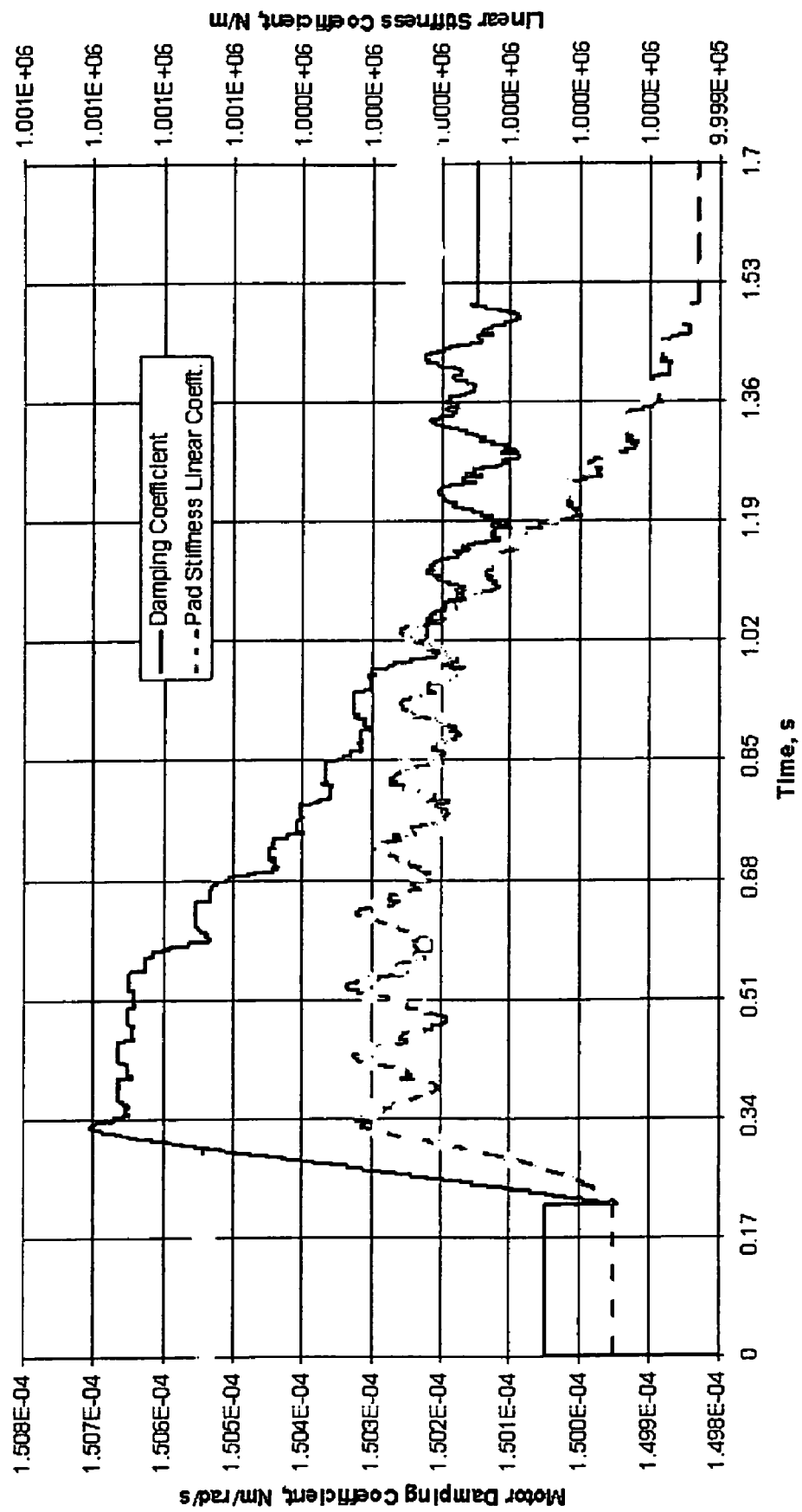
FIG. 8a is a graphical illustration of motor damping coefficient and linear stiffness coefficient results of a test for the estimated parameters using only Hall-Effect sensor signals for motor position measurement.
Figure 8B:
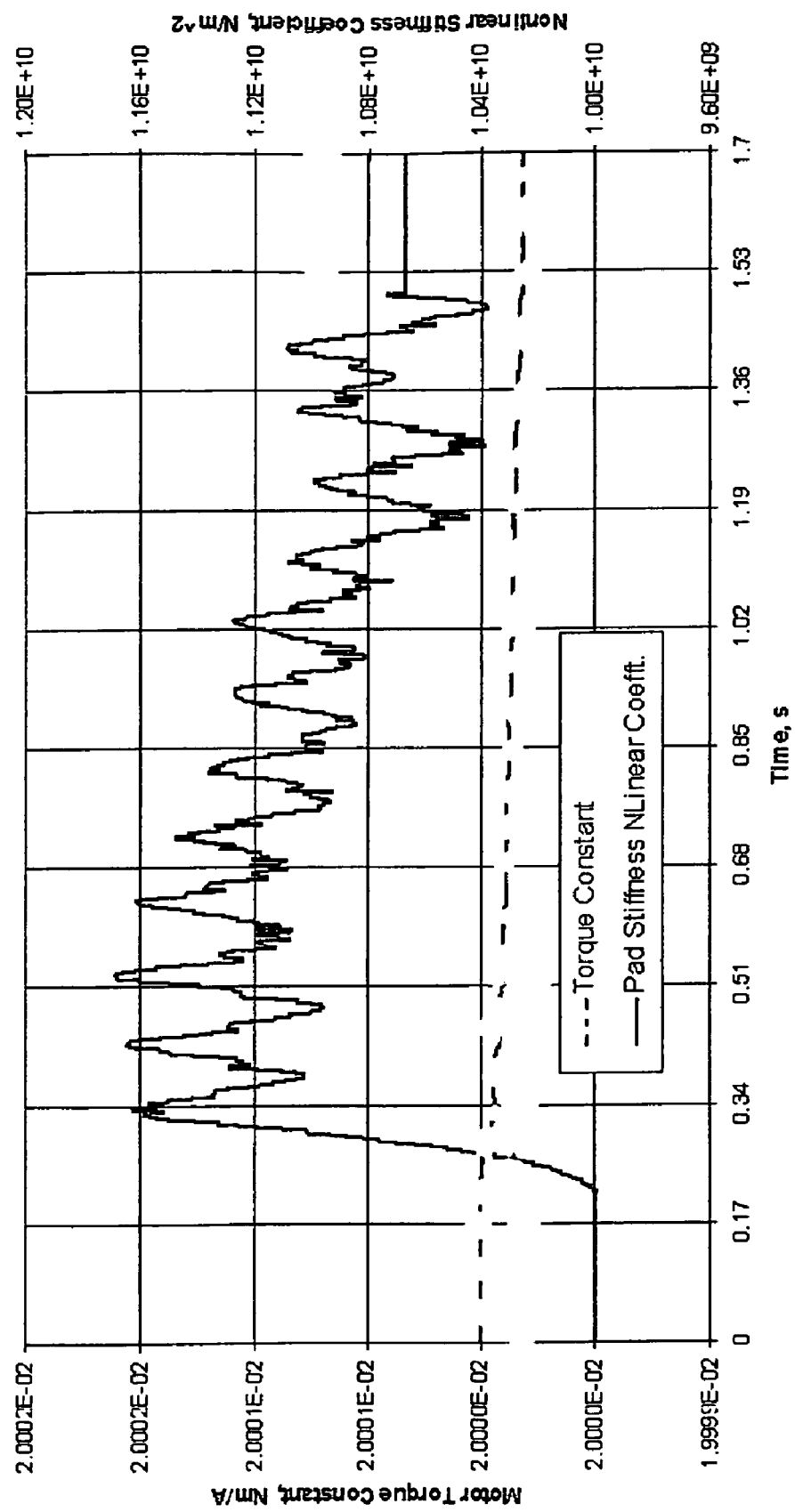

FIGS. 7a and 7b show the results of ten consecutive tests for off-line parameter estimation using an optical encoder as sensor 110. FIGS. 8a and 8b show similar test results using only Hall-Effect sensors' signals as sensor 110. This is a low cost method where no added sensors were used for the parameter identification or the control method. Therefore, as shown in FIGS. 7a, 7b, 8a and 8b, the control methods described herein provide consistent parameter values.

Thus, by generating new parameter values prior to (i.e., off-line) or during (i.e., on-line) operation of the system (e.g., an electromechanical brake system), the disclosed control system may provide a more accurate and robust control without the need for directly measuring the actuator force.

Although various aspects of the disclosed control system have been shown and described, modifications may occur to those skilled in the art upon reading the specification. The present application includes such modifications and is limited only by the scope of the claims.

What is claimed is:

1. A method for controlling a force exerted by an actuator on a load, said actuator being driven by a motor, said motor having a detectable motor condition, said method comprising the steps of:
    modeling said force using mathematical equations, wherein the force is a function of said motor condition and said motor condition comprises at least one parameter used in said mathematical equations, said parameter having an initial value;
    receiving a signal indicative of said motor condition;
    applying a known force command to said mathematical equations to determine a new value for said parameter based upon said known force command and said signal, said new value being different than said initial value;
    determining an observed force based at least in part upon said new value for said parameter and said signal; and
    controlling said force exerted by said actuator based at least in part upon said observed force.

2. The method of claim 1 wherein at least one of said parameter is selected from the group consisting of a linear stiffness coefficient, a nonlinear stiffness coefficient, a motor damping coefficient, and a motor torque constant.

3. The method of claim 1 wherein said parameter includes a linear stiffness coefficient, a nonlinear stiffness coefficient, and a motor damping coefficient.

4. The method of claim 1 wherein said parameter includes a linear stiffness coefficient and a nonlinear stiffness coefficient.

5. The method of claim 1 wherein at least one of said parameter is selected from the group consisting of a motor angle, a motor angular velocity, and a motor current.

6. The method of claim 1 wherein said known force command is applied with dither.

7. The method of claim 1 further comprising the step of storing said new value in a memory.

8. The method of claim 7 wherein said storing step includes the step of removing said initial value from said memory.

9. The method of claim 1 wherein said controlling step includes minimizing an error between a command force signal and said observed force.

10. The method of claim 1 wherein said new value is determined off line.

11. The method of claim 1 wherein said new value is determined on-line.

12. The method of claim 1 wherein said signal is received from a sensor capable of detecting said motor condition.

13. The method of claim 12 wherein said sensor is a Hall-Effect sensor.

14. The method of claim 12 wherein said sensor is a motor position sensor.

\* \* \* \* \*

UNITED STATES PATENT AND TRADEMARK OFFICE
CERTIFICATE OF CORRECTION

PATENT NO. : 7,630,813 B2  
APPLICATION NO. : 11/447708  
DATED : December 8, 2009  
INVENTOR(S) : Rassem Henry Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Second Day of November, 2010

David J. Kappos  
*Director of the United States Patent and Trademark Office*